(12) United States Patent
Schmidt et al.

(10) Patent No.: US 11,092,969 B2
(45) Date of Patent: Aug. 17, 2021

(54) SYSTEM AND METHOD FOR OPERATING A VEHICLE

(71) Applicant: SEW-EURODRIVE GMBH & CO. KG, Bruchsal (DE)

(72) Inventors: Josef Schmidt, Graben-Neudorf (DE); Jürgen Böckle, Bruchsal (DE); Zhidong Hua, Bruchsal (DE); Thomas Schäfer, Karlsdorf-Neuthard (DE); Andreas Wanjek, Waghäusel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 230 days.

(21) Appl. No.: 16/332,730

(22) PCT Filed: Jul. 14, 2017

(86) PCT No.: PCT/EP2017/025211
§ 371 (c)(1),
(2) Date: Mar. 12, 2019

(87) PCT Pub. No.: WO2018/046135
PCT Pub. Date: Mar. 15, 2018

(65) Prior Publication Data
US 2019/0369638 A1    Dec. 5, 2019

(30) Foreign Application Priority Data

Sep. 12, 2016 (DE) .................. 10 2016 010 879.7

(51) Int. Cl.
*G05D 1/02* (2020.01)
*B60W 40/10* (2012.01)

(52) U.S. Cl.
CPC ........... *G05D 1/0257* (2013.01); *B60W 40/10* (2013.01); *G05D 1/0272* (2013.01); *B60W 2520/06* (2013.01); *G05D 2201/0207* (2013.01)

(58) Field of Classification Search
CPC .............. G05D 1/0257; G05D 1/0265; B60W 2520/06
See application file for complete search history.

(56) References Cited

U.S. PATENT DOCUMENTS 3,008,532 A * 11/1961 Reed .................... G05D 1/0265
                                                            180/168
3,993,156 A    11/1976 Rubel
(Continued)

FOREIGN PATENT DOCUMENTS

DE    2445001 A1    4/1976
DE    2506961 A1    9/1976
(Continued)

OTHER PUBLICATIONS

International Search Report dated Dec. 15, 2017, in International Application No. PCT/EP2017/025211 (English-language translation).

*Primary Examiner* — Thomas G Black
*Assistant Examiner* — Tarek Elarabi
(74) *Attorney, Agent, or Firm* — Carter Deluca & Farrell LLP

(57) ABSTRACT

In a system and method for operating a vehicle, the system includes the vehicle and a concrete floor, which has at least one reinforcement rod, the vehicle is disposed on the concrete floor so as to be movable, the vehicle has an evaluation device and a first sensor group, which has at least two sensors, the sensors are situated along a first reference line at a distance from one another, the sensors are adapted to detect the reinforcement rod, and the evaluation device is (Continued)

connected to the sensors and adapted to determine the driving direction based on the signals from the sensors.

24 Claims, 8 Drawing Sheets

(56) References Cited

U.S. PATENT DOCUMENTS

| | | | |
|---|---|---|---|
| 4,079,801 A * | 3/1978 | Dobson | G05D 1/0265 |
| | | | 180/168 |
| 5,404,087 A * | 4/1995 | Sherman | G05D 1/0265 |
| | | | 180/168 |
| 5,524,723 A | 6/1996 | Gramling et al. | |
| 2003/0106731 A1 | 6/2003 | Marino et al. | |

FOREIGN PATENT DOCUMENTS

| | | |
|---|---|---|
| DE | 4312434 A1 | 9/1994 |
| DE | 10049402 A1 | 5/2002 |
| EP | 0614134 A1 | 9/1994 |
| WO | WO1991009356 A1 | 6/1991 |

* cited by examiner

SYSTEM AND METHOD FOR OPERATING A VEHICLE

FIELD OF THE INVENTION

The present invention relates to a system and a method for operating a vehicle.

BACKGROUND INFORMATION

German Published Patent Application No. 10 2005 008 555 describes a system and a method for determining a position.

PCT Patent Publication No. WO 91/09356 describes a method for the navigation of driverless vehicles.

German Published Patent Application No. 100 49 402 describes a method for determining the position of transport device.

SUMMARY

Example embodiments of the present invention provide a system for determining the driving direction of a vehicle while better protecting the environment.

According to an example embodiment of the present invention, a system for determining the driving direction of a vehicle includes the vehicle and a concrete floor, which is provided with at least one reinforcement rod, the vehicle is situated on the concrete floor so as to be able to be moveable, the vehicle includes an evaluation device and a first sensor group, which has at least two sensors, the sensors are situated along a first reference line at a distance from one another, the sensors are adapted to detect the reinforcement rod, and the evaluation device is connected to the sensors and adapted to determine the driving direction based on the signals from the sensors.

This has the advantage that it is possible to determine the driving direction of the vehicle relative to the reinforcement rod. For example, the concrete floor of a driving surface, in particular of a fabric hall, typically has reinforcement rods. Thus, the vehicle only needs to be equipped with the sensors and the evaluation device. The determination of the driving direction is therefore able to be carried out at a low outlay in terms of material. The environment is better protected.

In example embodiments, the vehicle has a second sensor group, which has at least two sensors, the sensors of the second sensor group being situated along a second reference line at a distance from one another, the first reference line and the second reference line being disposed at a distance from and parallel to one another; the sensors of the second sensor group are adapted to detect the reinforcement rod, and the evaluation device is connected to the sensors of the second sensor group and adapted to determine the driving direction based on the signals from the sensors of the second sensor group. This has the advantage that a directional deviation in the driving direction is able to be identified by comparing the driving direction determined by the sensors of the first sensor group and the driving direction determined by the sensors of the second sensor group. This makes it possible to correct the vehicle to the desired driving direction again.

In example embodiments, the sensors are situated on a vehicle bottom of the vehicle. This has the advantage that the distance between the vehicle and the concrete floor is smaller than in a placement of the sensor in other positions on the vehicle. A satisfactory signal-to-noise ratio is therefore achievable when determining the signal from the reinforcement rod. For example, only air is located between the sensor and the concrete floor.

In example embodiments, the sensors are radar sensors and/or inductive sensors, which are adapted to determine the thickness and/or the density and/or the depth of the reinforcement rod in the concrete floor. This has the advantage that a characteristic reference profile of the reinforcement along a driving route is able to be determined with the aid of the sensor.

In example embodiments, the vehicle has a vehicle control, and the vehicle is particularly arranged as a driverless transport vehicle, the vehicle control being connected to the evaluation device means. This has the advantage that the signals from the reinforcement rod are able to be evaluated by the vehicle and that this driving direction may be determined therefrom by the vehicle itself and this driving direction is able to be used for the autonomous control of the vehicle.

In example embodiments, the evaluation device has a processing unit, which is adapted to calculate trigonometric functions. This offers the advantage that the evaluation of the signals from the reinforcement rod is easily able to be carried out by the vehicle with the aid of the evaluation device.

In example embodiments, the evaluation device includes a time-measuring device, which is adapted to determine the time between two consecutive instants of the detection of the reinforcement rod. This has the advantage that the reinforcement rod, which was detected with the aid of a sensor of the second sensor group, is easy to allocate to the particular detection signal that was detected by a sensor of the first sensor group, by comparing the time between the two signals to a time span $\Delta t$, which is able to be determined using the distance of the sensor groups and the velocity of the vehicle.

In example embodiments, the system has a velocity sensor for determining velocity v of the vehicle in the driving direction. This offers the advantage that velocity deviations are detectable in an uncomplicated manner.

In example embodiments, the concrete floor has a multiplicity of reinforcement rods. This is advantageous insofar as the driving direction of the vehicle is able to be determined at different positions on the concrete floor with the aid of the reinforcement rods.

The reinforcement rods may be placed in the concrete floor in a distributed manner such that the vehicle detects a reinforcement rod at all times using a sensor of the first sensor group and/or a sensor of the second sensor group.

In order to distinguish the reinforcement rods, time span $\Delta t$ that passes between the instant at which a sensor of the first sensor group detects a reinforcement rod and the instant at which a sensor of the second sensor group detects the same reinforcement rod is calculated.

In example embodiments, the reinforcement rods are situated parallel to one another and/or in the form of a grid. This has the advantage that two sensors for each sensor group are sufficient to determine the driving direction of the vehicle.

In example embodiments, each sensor group has a multiplicity of sensors, and the evaluation device is adapted to evaluate the signals from the sensors of the first and the second sensor group. This offers the advantage of improving the measuring accuracy. The angle relative to the reinforcement rod may be calculated using different sensor pairs of a sensor group, and a mean value of the angles may be determined. The measuring accuracy is therefore improved.

In example embodiments, the evaluation device is adapted to select individual sensors from a sensor group for determining the driving direction of the vehicle. This offers the advantage that a sensor that permanently receives the signal from a reinforcement rod which crosses the reinforcement rod may be ignored by the evaluation device. The measuring accuracy is therefore improved.

According to an example embodiment of the present invention, in a method for operating a vehicle, in particular for determining the driving direction of the vehicle, in particular with the aid of a system for determining the driving direction of a vehicle as previously described, the vehicle being situated so as to be moveable on a concrete floor, the concrete floor having at least one reinforcement rod, the vehicle having at least one first sensor and one second sensor of a first sensor group, which are situated along a first reference line and are placed at a distance $a_1$ from one another, the vehicle drives across the reinforcement rod at a velocity v, the first sensor detects the reinforcement rod at a first instant $t_1$, the second sensor detects the reinforcement rod at a second instant $t_2$, in particular temporally following the first instant $t_1$, the time difference $t_{\alpha 1}$ between the first instant $t_1$ and the second instant $t_2$ is determined, and an angle $a_1$ is determined from the time difference $t_{\alpha 1}$, the velocity v, and the distance $\alpha_1$, which indicates the angle between the driving direction of the vehicle and the extension direction of the reinforcement rod at the first and/or the second instant.

According to example embodiments of the present invention, this determination is carried out only when the sensors actually detect the reinforcement rod, i.e. cross it, and thus generate corresponding signals. In all other cases, the driving direction is considered to be parallel to the reinforcement rod, or it is allocated a predefined directional angle value.

This has the advantage that the driving direction of the vehicle relative to the reinforcement rod is able to be determined. As a rule, the concrete floor of a driving surface, in particular of a factory hall, may have reinforcement rods. It is therefore only necessary to equip the vehicle with sensors and an evaluation device for evaluating the signals from the reinforcement rod. Thus, the driving direction is able to be determined at a low outlay in terms of material. The environment is better protected.

In example embodiments, the vehicle drives at a constant velocity v, and the angle $\alpha_1$ is calculated according to the following relationship:

$$\alpha_1 = \arctan\frac{v \cdot t_{\alpha 1}}{a_1}$$

This offers the advantage that the driving direction may be easily determined with the aid of the evaluation device.

In example embodiments, the vehicle has a second sensor group, the second sensor group having at least two sensors which are situated along a second reference line at a distance $a_2$ from one another, the first sensor group and the second sensor group being placed such that the first reference line and the second reference line are situated parallel to each other and are set apart from one another by distance x, a first sensor of the second sensor group detecting the reinforcement rod at a third instant $t_3$ temporally following the second instant $t_2$, a second sensor of the second sensor group detecting the reinforcement rod at a fourth instant $t_4$, in particular temporally following the third instant $t_3$, the time difference $t_{\alpha 2}$ between the third instant $t_3$ and the fourth instant $t_4$ being determined, an angle $\alpha_2$ being determined from the time difference $t_{\alpha 2}$, the velocity v and the distance $a_2$, which indicates the angle between the driving direction of the vehicle and the extension direction of the reinforcement rod at the third and/or fourth instant. This offers the advantage that a directional deviation from the driving direction is able to be detected by comparing the driving direction determined by the sensors of the first sensor group with the driving direction determined by the sensors of the second sensor group. The vehicle is thereby able to be corrected to the desired driving direction again.

In example embodiments, the vehicle is driving at a constant velocity v, and the angle $\alpha_2$ is calculated according to the following relationship:

$$\alpha_2 = \arctan\frac{v \cdot t_{\alpha 2}}{a_2}$$

This has the advantage that the driving direction is easily determined with the aid of the evaluation device.

In example embodiments, the vehicle uses the difference of the angles $\alpha_1$ and $\alpha_2$ for the control of the vehicle, the difference of the angles $\alpha_1$ and $\alpha_2$ indicating a directional change in the driving direction during the traveled distance x, i.e. a steering angle, in particular the steering angle thus determined is controlled to a setpoint value with the aid of a controller of the vehicle by setting a steering drive of the vehicle accordingly, and/or the determined steering angle is monitored for an impermissible exceeding of a predefinable limit value.

As a result, this has the advantage that the steering angle is monitored for impermissibly high values and/or that the steering angle may be used for steering the vehicle.

In example embodiments, time span Δt is calculated with the aid of velocity v and distance x between the sensor groups, according to the following relationship:

$$\Delta t = \frac{x}{v},$$

where $$t_1 - t_3 - \Delta t \leq S,$$

S being a predefinable threshold value, the amount of the threshold value in particular being less than one-fifth or less than one-twentieth of time span Δt.

This has the advantage that a detection signals that was detected with the aid of a sensor of the second sensor group is easily able to be allocated to the detection signal that was detected by a sensor of the first sensor group, this being done by comparing the time between the two signals to time span Δt.

In particular in a system having a multiplicity of reinforcement rods that are situated at a distance from and parallel to one another, a suitable specification of the threshold value makes it possible to avoid that the sensor group in front and in back do not detect the same reinforcement rod.

In example embodiments, the following temporally successive method steps are carried out in order to determine the velocity of the vehicle along a driving route: in a first method step, the vehicle carries out a reference drive at a constant velocity along the driving route, one of the sensors records measuring points along the driving route, and each measuring point allocates a signal from a system of reinforcement rods in the concrete floor to a position on the driving route, in a second method step, a reference profile of the driving route is determined based on the measuring points ascertained during the reference drive, in a third method step, the vehicle drives along the driving route and records further measuring points with the aid of the sensor used during the reference drive, in a fourth method step, a profile segment is determined from the further measuring points, in a fifth method step, the profile segment is uniquely allocated to a segment of the reference profile, in particular with the aid of a correlation method, in a sixth method step, positions on the driving route are uniquely allocated to the vehicle with the aid of the profile segment allocated to the reference profile, and in a seventh method step, the velocity of the vehicle (1) is determined from the positions on the driving route and the time span between the measuring points of these positions.

This has the advantage that the velocity of the vehicle is able to be determined in a redundant manner using the velocity sensor and the sensor. The measuring accuracy is therefore improved.

For example, the velocity sensor may be omitted. The environment is therefore better protected.

Further features and aspects of example embodiments of the present invention are described in greater detail below with reference to the Figures.

DETAILED DESCRIPTION

Figure 1:
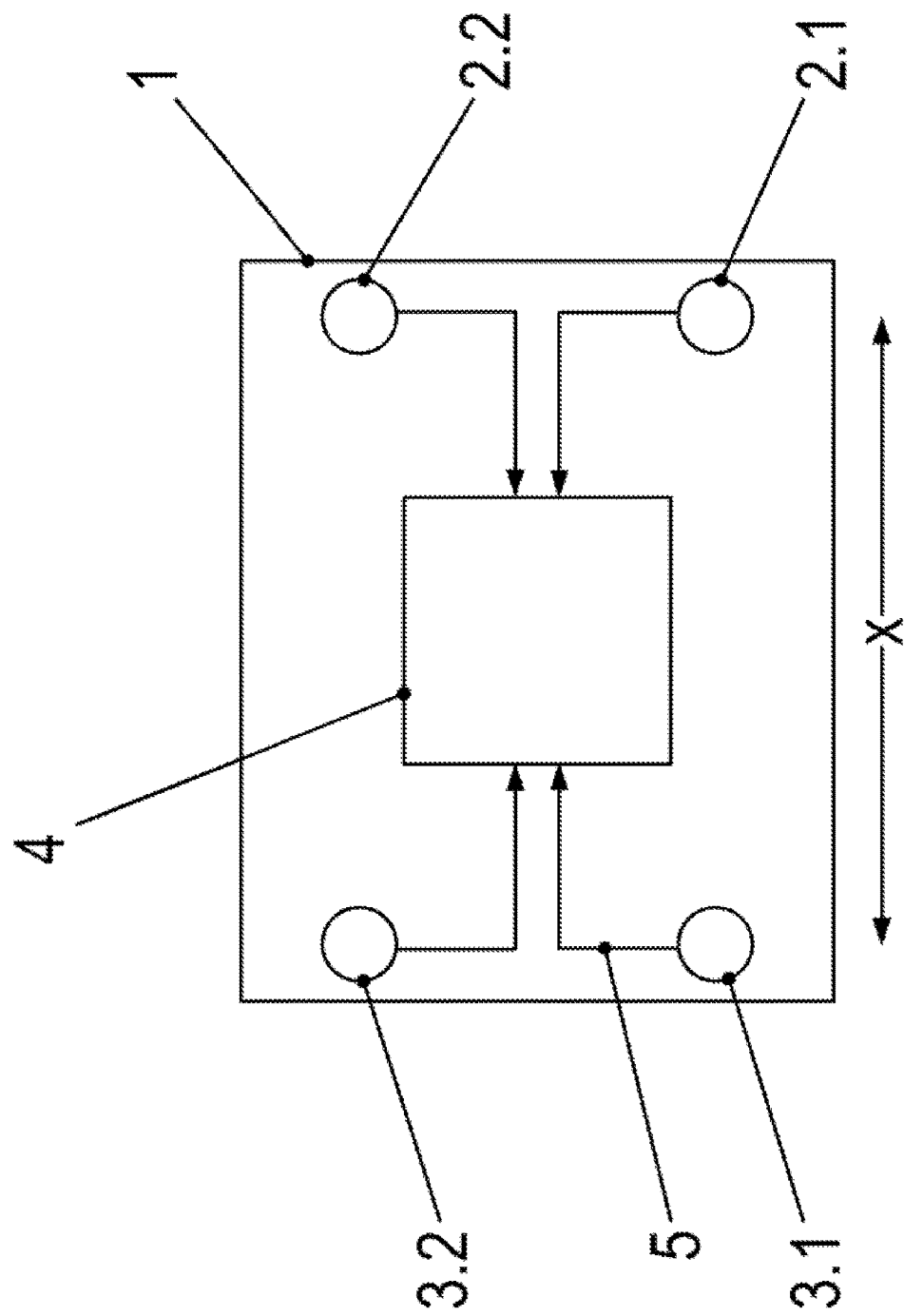
In FIG. 1, a vehicle 1 of a system according to an example embodiment of the present invention for determining the driving direction of a vehicle is schematically shown in a plan view.
Figure 2:
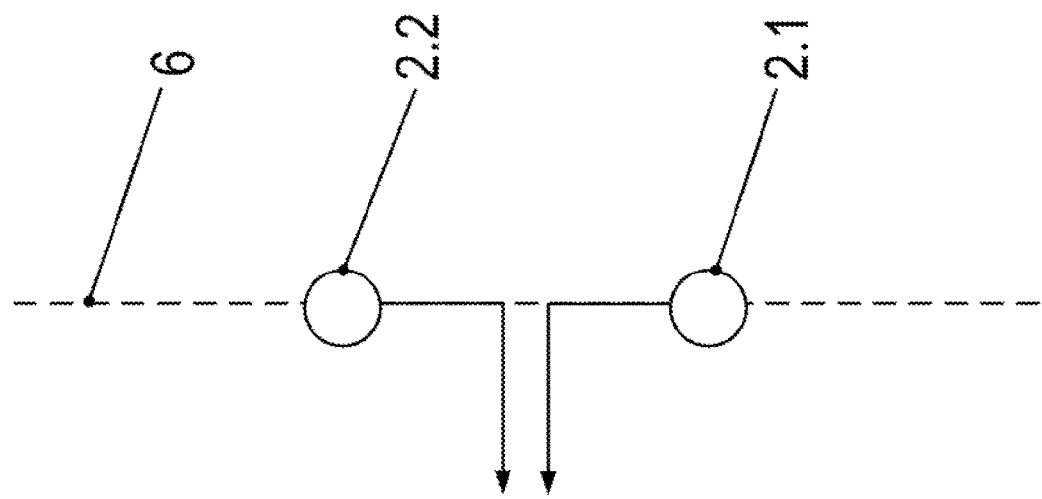
FIG. 2 shows a plan view of two sensors (2.1, 2.2) of a sensor group of vehicle 1, which are situated on a reference line 6.

Vehicle 1 shown in FIG. 1 has a first and a second sensor group for detecting the reinforcement in the concrete floor; each sensor group has at least two sensors (2.1, 2.2, 3.1, 3.2), which are disposed along a respective reference line 6 and are situated at a distance from each other. Sensors (2.1, 2.2, 3.1, 3.2) are situated on vehicle 1 such that the reference lines of the first and the second sensor group are disposed in parallel in each case. The sensor groups are spaced apart from each other by a distance x.

The sensors (2.1, 2.2, 3.1, 3.2) may be arranged as inductive sensors and/or radar sensors. For example, the sensors (2.1, 2.2, 3.1, 3.2) are situated on the vehicle bottom of vehicle 1 and oriented in the direction of the concrete floor.

The reference lines of the first and the second sensor groups may be situated transversely to driving direction 9 of vehicle 1.

Vehicle 1 has an evaluation device 4 connected to the sensors (2.1, 2.2, 3.1, 3.2) of the sensor groups, in particular with the aid of a connection device 5. Evaluation device 4 is adapted to evaluate the signals from the sensors (2.1, 2.2, 3.1, 3.2). Evaluation device 4 may include has a processing unit, which is adapted to calculate trigonometric functions.

Vehicle 1 has a velocity sensor, and evaluation device 4 is connected to the velocity sensor. Evaluation device 4 is adapted to evaluate the signals from the velocity sensor.

The system for determining the driving direction of a vehicle has vehicle 1 and the concrete floor, and vehicle 1 is moveable on the concrete floor.

The concrete floor has the reinforcement for armoring the concrete floor. The reinforcement is metallic and has greater ductility than concrete. The reinforcement is, for example, made of steel, in particular of concrete reinforcing steel. Concrete reinforcing steel bars and/or concrete reinforcing steel mesh and/or concrete reinforcing steel in rings and/or reinforcing wire and/or lattice girders may be used as reinforcements. The reinforcement may include reinforcement rods 7, which are at least partially arranged in straight form.

The reinforcement in the concrete floor is able to be detected with the aid of a radar sensor and/or an inductive sensor. Intensity I of the signal from the reinforcement is a function of the depth of the reinforcement in the concrete floor and of the thickness of the reinforcement at the measuring location. A node of two reinforcement rods 7, for instance, causes a larger signal than a single reinforcement rod 7.

Figure 3:
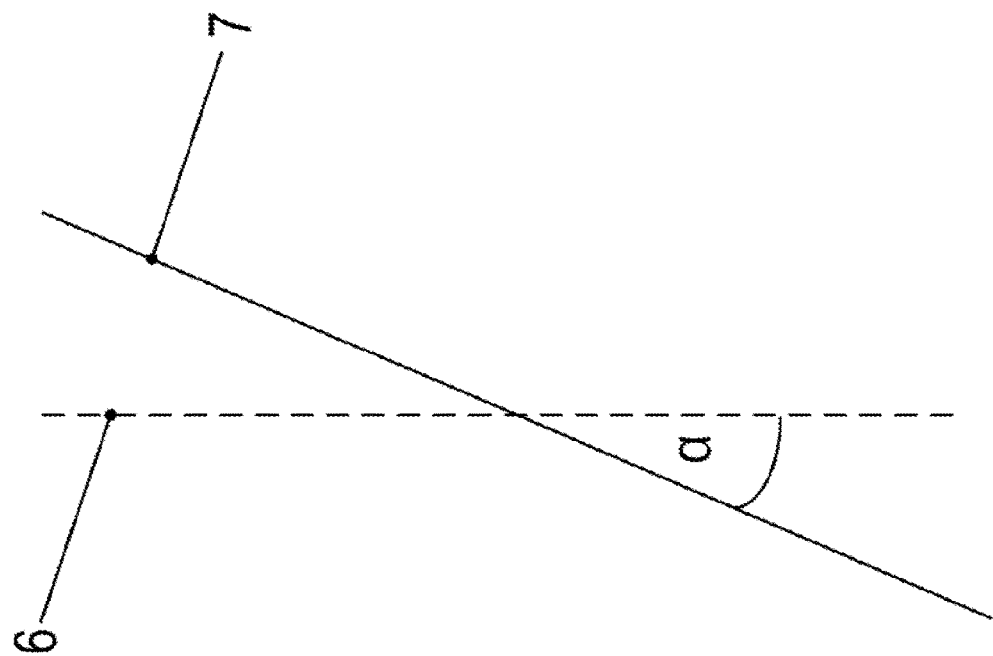
FIG. 3 schematically shows a reinforcement rod 7 of a reinforcement of a concrete floor of the system and its position relative to reference line 6.

As illustrated in FIG. 3, angle $\alpha$ between a reinforcement rod 7 and a reference line 6 is determined in order to ascertain driving direction 9 of vehicle 1.

As long as no detection of a reinforcement rod 7 takes place despite a non-vanishing driving velocity of vehicle 1, the driving direction is considered to be parallel to reinforcement rod 7 or is allocated to some other predefined starting directional angle value. However, when a reinforcement rod is detected with the aid of the sensors and signals from the sensors are therefore generated, then a determination of the driving-direction angle is carried out.

Figure 4:
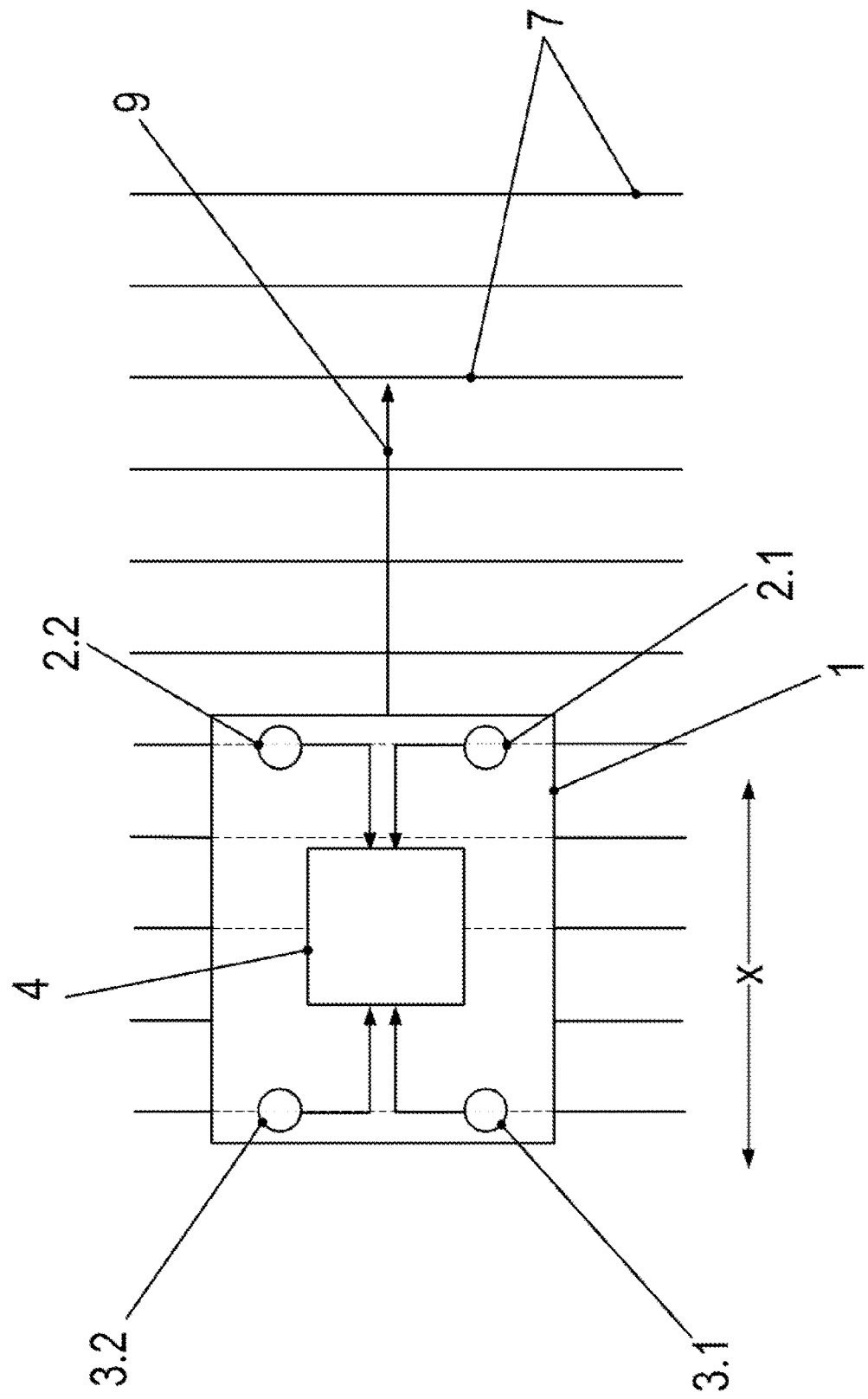
FIG. 4 schematically shows a first application example of the system, where vehicle 1 is driving in driving direction 9 on the concrete floor having reinforcement rods 7, the concrete floor being shown in transparent form.
Figure 5:
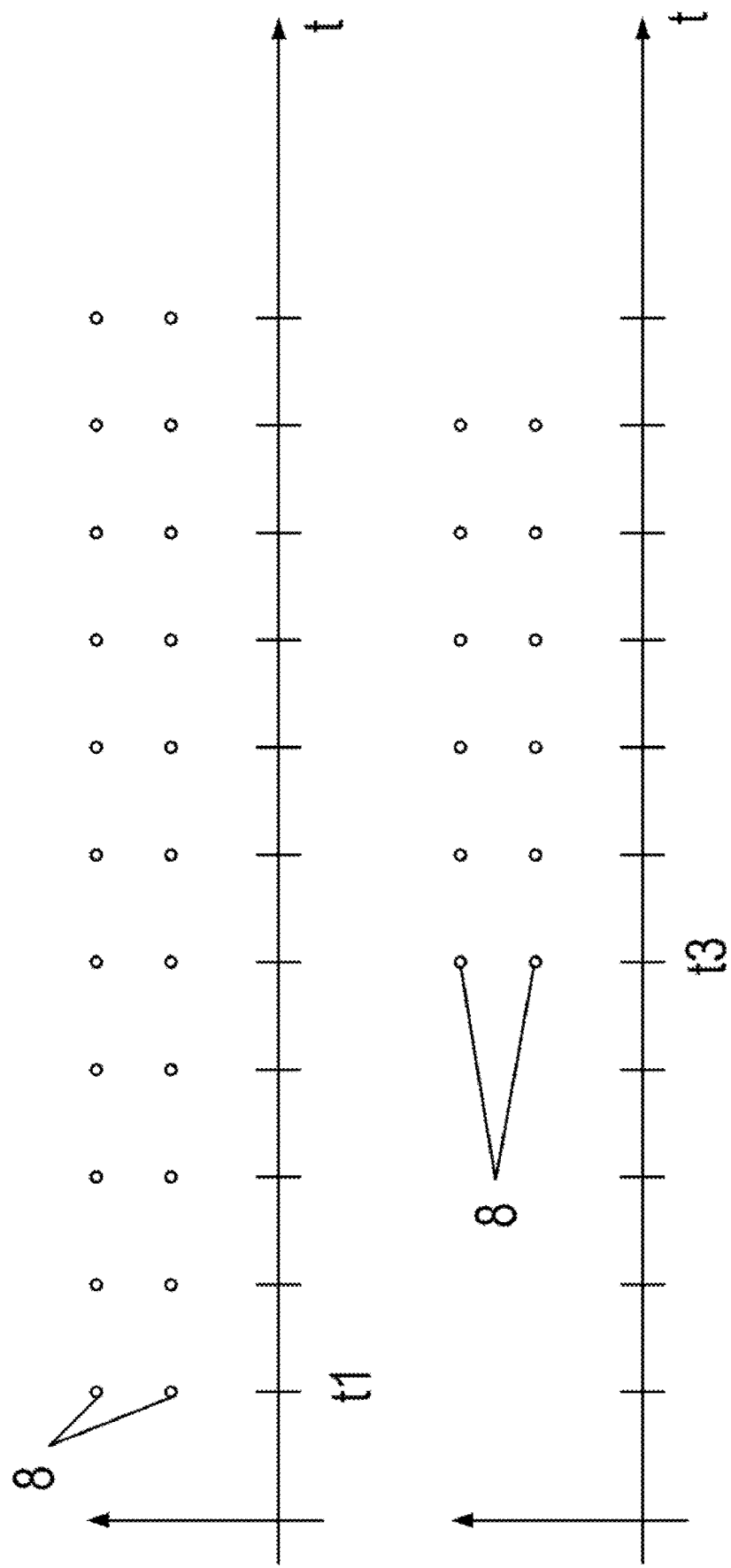
FIG. 5 shows measuring points of the sensors (2.1, 2.2, 3.1, 3.2) in the first application example as a function of time t.

FIGS. 4 and 5 show the first application example of the system a. Vehicle 1 is aligned on the concrete floor such that reference lines 6 of the sensor groups are situated parallel to a reinforcement rod 7. In other words, angle $\alpha$ is equal to 0°. The reinforcement may have a multiplicity of reinforcement rods 7 disposed in parallel.

In FIG. 5, the measuring points of the first sensor group are shown in the upper diagram and the measuring points of the second sensor group are shown in the lower diagram as a function of time t. The respective upper measuring row shows the measuring points of the respective first sensor (2.1, 3.1) of the respective sensor group, and the lower measuring row shows the respective measuring points of the respective second sensor (2.2, 3.2) of the respective sensor group.

Vehicle 1 travels in driving direction 9 on the concrete floor across reinforcement rods 7. The vehicle may drive at a constant velocity v.

At a first instant $t_1$, the sensors (2.1, 2.2) of the first sensor group simultaneously detect a reinforcement rod 7. At a third instant $t_3$, the sensors (3.1, 3.2) of the second sensor group simultaneously detect reinforcement rod 7.

The velocity sensor may detect velocity v of vehicle 1.

Using the velocity v and the distance x between the sensor groups, it is possible to determine the time span $\Delta t = t_1 - t_3 = x/v$ which vehicle 1 requires until the sensors (3.1, 3.2) of the second sensor group detect reinforcement rod 7 after reinforcement rod 7 was detected by the sensors (2.1, 2.2) of the first sensor group.

If the sensors (2.1, 2.2) of the first sensor group detect reinforcement rod 7 at the same time but the sensors (3.1, 3.2) of the second sensor group detect reinforcement rod at a time offset, then driving direction 9 of vehicle 1 was varied during time span $\Delta t$.

If time $t_3$ deviates from the value for $t_3$ calculated with the aid of $\Delta t$, then velocity v was determined incorrectly or velocity v was modified during time span $\Delta t$.

Figure 6:
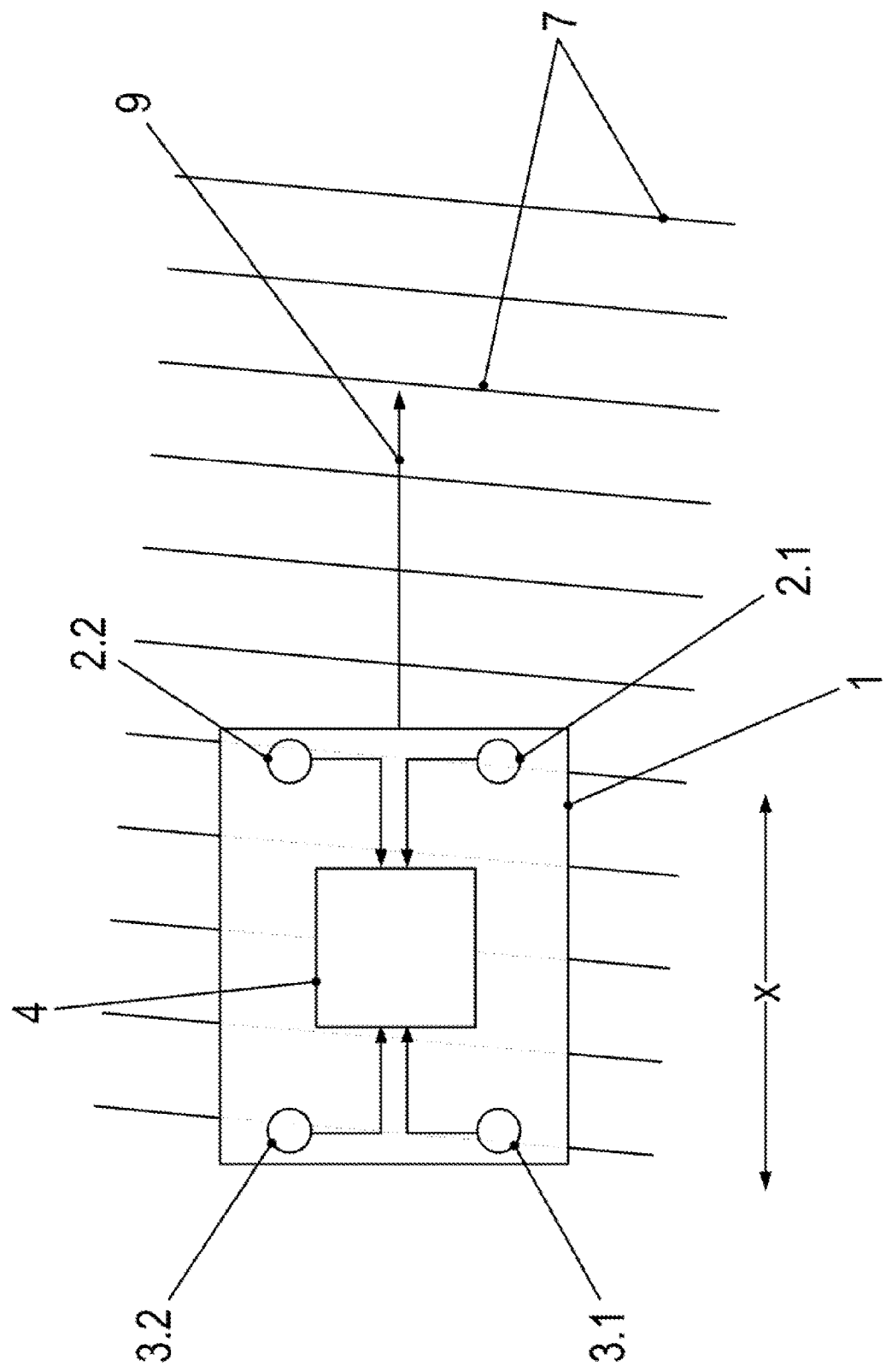
FIG. 6 schematically shows a second application example of the system, where vehicle 1 is driving in driving direction 9 on the concrete floor having reinforcement rods 7, and the concrete floor is shown in transparent form.
Figure 7:
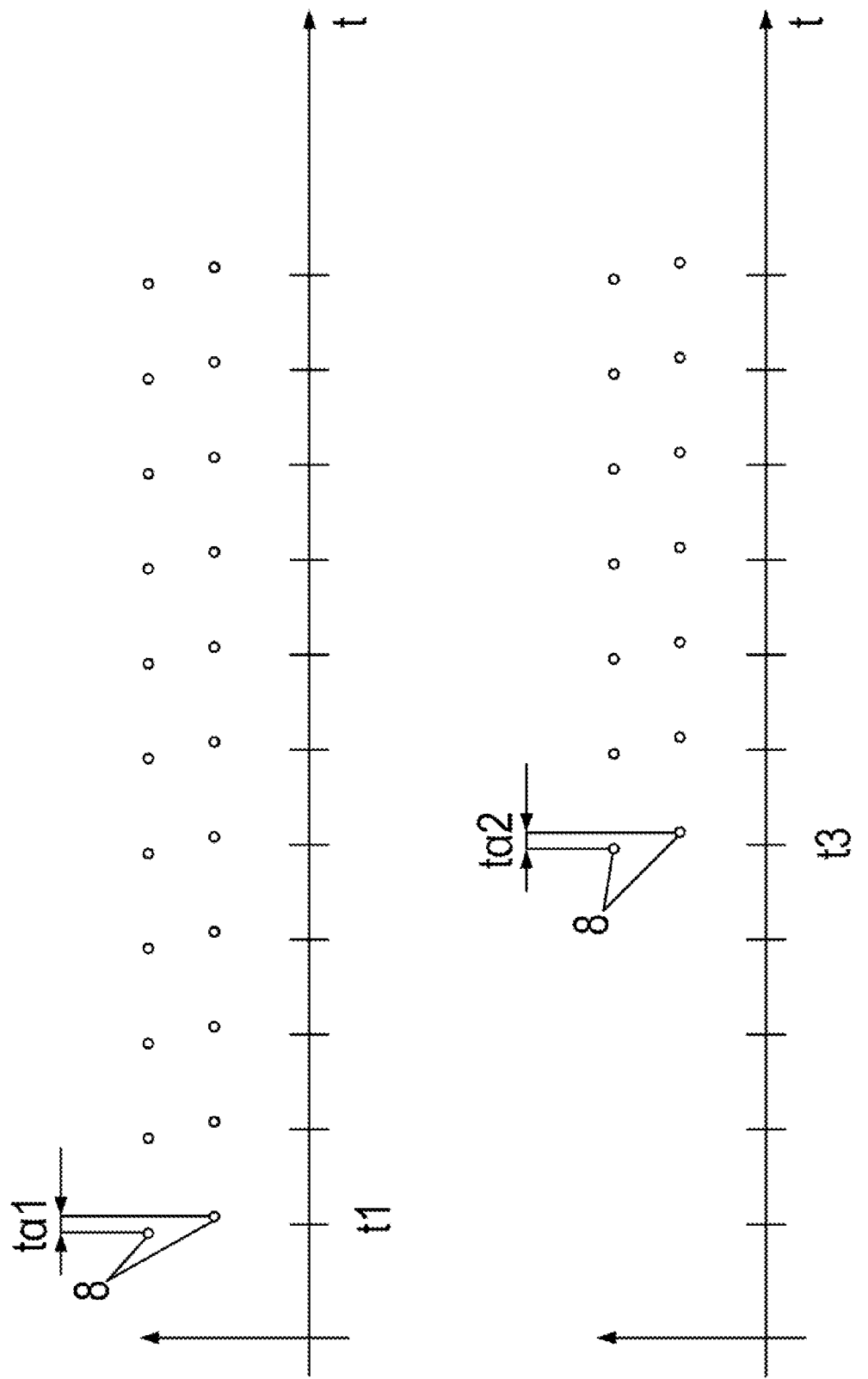
FIG. 7 shows measuring points of the sensors (2.1, 2.2, 3.1, 3.2) in the first application example as a function of time t.
Figure 8:
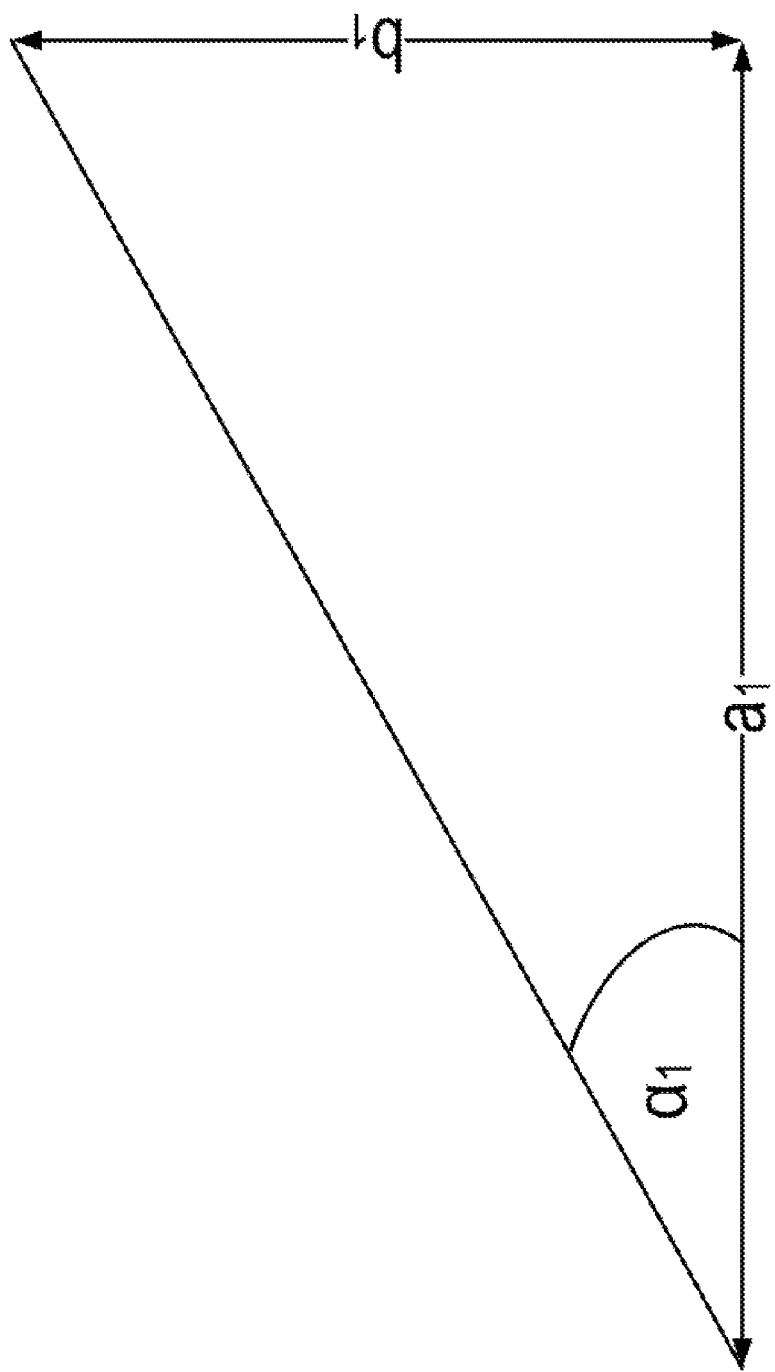
FIG. 8 shows distance b traveled in a time $t_{\alpha 1}$ and distance $a_1$ between two sensors (2.1, 2.2) of a first sensor group and an angle $\alpha_1$ resulting therefrom.

FIGS. 6 through 8 show the second application example of the method. Vehicle 1 is oriented on the concrete floor such that reference lines 6 of the sensor groups are situated at a non-vanishing angle $\alpha$ in relation to a reinforcement rod 7. The reinforcement may include a multiplicity of reinforcement rods 7 disposed in parallel.

In FIG. 7, the measuring points of the first sensor group are shown in the upper diagram, and the measuring points of the second sensor groups are shown in the lower diagram as a function of time t. The respective upper measuring row shows the measuring points of the respective first sensor (2.1, 3.1) of the respective sensor group, and the lower measuring row shows the respective measuring points of the respective second sensor (2.2, 3.2) of the respective sensor group.

The velocity sensor may detect the velocity v of vehicle 1.

The first and the second sensor (2.1, 2.2) of the first sensor group detect reinforcement rod 7 at a time offset $t_{\alpha 1}$. Using the time difference $t_{\alpha 1}$, the velocity v and the distance $a_1$ between first sensor 2.1 and second sensor 2.2 of the first sensor group, angle $\alpha_1$ between reference line 6 of the first sensor group and reinforcement rod 7 is calculated according to the following relationship:

$$\alpha_1 = \arctan\frac{b_1}{a_1} = \arctan\frac{v \cdot t_{\alpha 1}}{a_1}$$

where $b_1 = v \cdot t_{\alpha 1}$ is the distance $b_1$ traveled by vehicle 1 in the time difference $t_{\alpha 1}$.

The first and the second sensor (3.1, 3.2) of the second sensor group detect reinforcement rod 7 at a time offset $t_{\alpha 2}$. With the aid of the time difference $t_{\alpha 2}$, the velocity v and the distance $a_2$ between first sensor 3.1 and second sensor 3.2 of the second sensor group, angle $\alpha_2$ between reference line 6 of the second sensor group and reinforcement rod 7 is calculated according to the following relationship:

$$\alpha_2 = \arctan\frac{b_2}{a_2} = \arctan\frac{v \cdot t_{\alpha 2}}{a_2}$$

where $b_2 = v \cdot t_{\alpha 2}$ is the distance $b_2$ traveled by vehicle 1 in the time difference $t_{\alpha 2}$.

If $\alpha_1$ and $\alpha_2$ are equal, then driving direction 9 of the vehicle has remained unchanged relative to the reinforcement during time $\Delta t$.

If $\alpha_1$ and $\alpha_2$ are unequal, then driving direction 9 of the vehicle relative to the reinforcement has been modified during time $\Delta t$.

Each sensor group may have a multiplicity of sensors (2.1, 2.2, 3.1, 3.2), which are situated on a reference line 6 in each case. Using the multiplicity of sensors (2.1, 2.2, 3.1, 3.2), signals from other reinforcement rods that cross reinforcement rod 7 are able to be averaged out. For example, a sensor which permanently detects a reinforcement rod that crosses reinforcement rod 7 is not considered when calculating angles $\alpha_1$ and $\alpha_2$.

For the further application case that vehicle 1 is to drive the same route repeatedly, vehicle 1 carries out a reference drive at a constant velocity and determines measuring points along the entire driving route with the aid of one of the sensors (2.1, 2.2, 3.1, 3.2). Using the measuring points of the reference drive, a reference profile is determined. The reference profile indicates an intensity of the signal from the reinforcement for each position along the driving route.

The distances between reinforcement rods 7 are able to be determined from the intensity maxima of the reference profile. As a result, instead of using the velocity sensor, the velocity of vehicle 1 is able to be determined during the drive from the time between two intensity maxima. For this purpose, the position of vehicle 1 on the driving route may be determined as well.

In order to determine the position of vehicle 1 on the driving route, measuring points of a profile segment are determined with the aid of the sensor (2.1, 2.2, 3.1, 3.2) that was used during the reference drive. Evaluation device 4 compares this profile segment to the reference profile, in particular with the aid of a correlation method. If the profile segment unequivocally agrees with a segment of the reference profile, then it is possible to allocate each measuring point of the profile segment to a position on the driving route.

The instantaneous position of vehicle 1 is determined by the comparison of an instantaneous measuring point with the profile segment and the allocated segment of the reference profile.

LIST OF REFERENCE CHARACTERS

1 vehicle
2.1 first sensor of the first sensor group
2.2 second sensor of the first sensor group
3.1 first sensor of the second sensor group
3.2 second sensor of the second sensor group
4 evaluation device
5 connection device
6 reference line
7 reinforcement rod
8 measuring point
9 driving direction
$\alpha$ angle
a distance
$b_1$ distance
x distance

The invention claimed is:
1. A system, comprising:
a concrete floor including at least one reinforcement rod; and a vehicle movable on the concrete floor and including an evaluation device and a first sensor group having at least two sensors arranged along a first reference line at a distance from each other, the sensors adapted to sense and/or detect the reinforcement rod, the evaluation device connected to the sensors and adapted to determine a driving direction of the vehicle based on signals from the sensors;

wherein the system is adapted to perform a method including:
  determining a driving direction of the vehicle to be parallel to the reinforcement rod or to another predefined starting directional angle value until the vehicle drives across the reinforcement rod at a velocity;
  detecting the reinforcement rod at a first instant by a first sensor of the first sensor group;
  detecting the reinforcement rod at a second instant, following the first instant, by a second sensor of the first sensor group;
  determining a time difference between the first instant and the second instant; and
  determining an angle, based on the time difference, the velocity, and the distance, between the driving direction of the vehicle and an extension direction of the reinforcement rod at the first and/or second instant or determining that the driving direction is parallel to the reinforcement rod.

2. The system according to claim 1, wherein includes a second sensor group having at least two sensors arranged along a second reference line and at a distance from each other, the first reference line and the second reference line being parallel and spaced apart from each other, the sensors of the second sensor group adapted to detect the reinforcement rod, the evaluation device connected to the sensors of the second sensor group and adapted to determine the driving direction based on signals from the sensors of the second sensor group.

3. The system according to claim 2, wherein each sensor group includes a plurality of sensors, the evaluation device adapted to evaluate the signals from the sensors of the first sensor group and the second sensor group.

4. The system according to claim 3, wherein the evaluation device is adapted to select individual sensors of at least one of the sensor groups to determine the driving direction of the vehicle.

5. The system according to claim 1, wherein the sensors are arranged on a vehicle bottom of the vehicle.

6. The system according to claim 1, wherein the sensors include radar sensors and/or inductive sensors adapted to determine a thickness, a density, and/or a depth of the reinforcement rod in the concrete floor.

7. The system according to claim 1, wherein the vehicle includes a vehicle control connected to the evaluation device and is arranged as a driverless transport vehicle.

8. The system according to claim 1, wherein the evaluation device includes a processing unit adapted to calculate trigonometric functions.

9. The system according to claim 1, wherein the evaluation device includes a time-measuring device adapted to determine a time between two detections of the reinforcement rod.

10. The system according to claim 9, wherein the time-measurement device is adapted to determine the time between an instant of detection of the reinforcement rod by a first sensor and an instant of detection of the reinforcement rod by a second sensor.

11. The system according to claim 1, further comprising a velocity sensor adapted to determine a velocity of the vehicle in the driving direction.

12. The system according to claim 1, wherein the concrete floor includes a plurality of reinforcement rods arranged parallel to one each other and/or in the form of a grid.

13. A system, comprising:
  a vehicle movable on a concrete floor having at least one reinforcement rod, the vehicle including an evaluation device and a first sensor group having at least two sensors arranged along a first reference line at a distance from each other, the sensors adapted to sense and/or detect the reinforcement rod, the evaluation device connected to the sensors and adapted to determine a driving direction of the vehicle based on signals from the sensors;
  wherein the system is adapted to perform a method including:
    determining a driving direction of the vehicle to be parallel to the reinforcement rod or to another predefined starting directional angle value until the vehicle drives across the reinforcement rod at a velocity;
    detecting the reinforcement rod at a first instant by a first sensor of the first sensor group;
    detecting the reinforcement rod at a second instant, following the first instant, by a second sensor of the first sensor group;
    determining a time difference between the first instant and the second instant; and
    determining an angle, based on the time difference, the velocity, and the distance, between the driving direction of the vehicle and an extension direction of the reinforcement rod at the first and/or second instant or determining that the driving direction is parallel to the reinforcement rod.

14. A method for operating a vehicle including a first sensor group having a first sensor and a second sensor arranged along a first reference line at a distance from each other, the vehicle being movable on a concrete floor having at least one reinforcement rod, comprising:
  determining a driving direction of the vehicle to be parallel to the reinforcement rod or to another predefined starting directional angle value until the vehicle drives across the reinforcement rod at a velocity;
  detecting the reinforcement rod at a first instant by the first sensor;
  detecting the reinforcement rod at a second instant, following the first instant, by the second sensor;
  determining a time difference between the first instant and the second instant; and
  determining an angle, based on the time difference, the velocity, and the distance, between the driving direction of the vehicle and an extension direction of the reinforcement rod at the first and/or second instant or determining that the driving direction is parallel to the reinforcement rod.

15. The method according to claim 14, wherein the vehicle drives at a constant velocity, and the angle is calculated based on the relationship:

$$\alpha_1 = \arctan \frac{v \cdot t_{\alpha 1}}{a_1}$$

$\alpha_1$ representing the angle, v representing the velocity, $t_{\alpha 1}$ representing the time difference, and $a_1$ representing the distance.

16. The method according to claim 14, wherein the vehicle includes a second sensor group having at least two sensors arranged along a second reference line and set apart from one each other by a distance, the first reference line and the second reference line arranged parallel to each other and set apart from each other by a distance, a first sensor of the second sensor group detecting the reinforcement rod at a third instant temporally following the second instant, a second sensor of the second sensor group detecting the reinforcement rod at a fourth instant temporally following the third instant, a time difference between the third instant and the fourth instant being determined, and the time difference between the third instant and the fourth instant, the velocity, and the distance between the sensors of the second sensor group are used to determine an angle that indicates the angle between the driving direction of the vehicle and the extension direction of the reinforcement rod at the third and/or the fourth instant.

17. The method according to claim 16, wherein the vehicle drives at a constant velocity, and the angle between the driving direction of the vehicle and the extension direction of the reinforcement rod at the third and/or the fourth instant is calculated based on the relationship:

$$\alpha_2 = \arctan\frac{v \cdot t_{\alpha 2}}{a_2}$$

$\alpha_2$ representing the angle between the driving direction of the vehicle and the extension direction of the reinforcement rod at the third and/or the fourth instant, v representing the velocity, $t_{\alpha 2}$ representing the time difference between the third instant and the fourth instant, and $a_2$ representing the distance between the sensors of the second sensor group.

18. The method according to claim 16, wherein the vehicle uses a difference of the angles to control the vehicle, the difference of the angles and indicating a directional change in the driving direction during a traveled distance and/or a steering angle.

19. The method according to claim 18, wherein a controller of the vehicle controls the steering angle to a setpoint value by setting a steering drive of the vehicle accordingly.

20. The method according to claim 18, wherein the steering angle is monitored for an impermissible exceeding of a predefinable limit value.

21. The method according to claim 16, wherein a time span is calculated using the velocity and the distance between the sensor groups based on the relationships:

$$\Delta t = \frac{x}{v}$$

and $$t_1 - t_3 - \Delta t \leq S$$

$\Delta t$ representing the time span, x representing the distance between the sensor groups, v representing the velocity, $t_1$ representing the first instant, $t_3$ representing the third instant, and S representing a predefinable threshold value.

22. The method according to claim 21, wherein the threshold value is less than one-fifth and/or less than one-twentieth of the time span.

23. The method according to claim 14, wherein the method includes the following steps to determine the velocity of the vehicle along a driving route:

in a first method step, the vehicle performs a reference drive at a constant velocity along the driving route, one of the sensors records measuring points along the driving route, and each measuring point allocates a signal from a system of reinforcement rods in the concrete floor to a position on the driving route;

in a second method step, a reference profile of the driving route is determined from the measuring points ascertained during the reference drive;

in a third method step, the vehicle drives along the driving route and records further measuring points with the aid of the sensor used during the reference drive;

in a fourth method step, a profile segment is determined from the further measuring points;

in a fifth method step, the profile segment is uniquely allocated to a segment of the reference profile with the aid of a correlation method;

in a sixth method step, positions on the driving route are uniquely allocated to the vehicle with the aid of the profile segment allocated to the reference profile; and in a seventh method step, the velocity of the vehicle is determined from the positions on the driving route and the time span between the measuring points of the positions.

24. The method according to claim 14, wherein the vehicle includes an evaluation device, the sensors being adapted to sense and/or detect the reinforcement rod, the evaluation device being connected to the sensors and adapted to determine the driving direction of the vehicle based on signals from the sensors.

* * * * *